United States Patent
Bertacchini et al.

(10) Patent No.: US 11,282,372 B2
(45) Date of Patent: Mar. 22, 2022

(54) METHODS FOR DETECTING TAMPERING OF TARGET DETECTION SYSTEMS

(71) Applicant: Inxpect S.p.A., Brescia (IT)

(72) Inventors: Ugo Bertacchini, Brescia (IT); Alessio Degani, Brescia (IT); Marco Garatti, Brescia (IT); Lorenzo Nava, Brescia (IT); Matteo Radaelli, Brescia (IT); Andrea Tartaro, Brescia (IT)

(73) Assignee: INXPECT S.P.A., Brescia (IT)

( * ) Notice: Subject to any disclaimer, the term of this patent is extended or adjusted under 35 U.S.C. 154(b) by 6 days.

(21) Appl. No.: 16/879,382

(22) Filed: May 20, 2020

(65) Prior Publication Data

US 2020/0372784 A1   Nov. 26, 2020

(30) Foreign Application Priority Data

May 21, 2019   (IT) .................. 102019000007059

(51) Int. Cl.
   *G08B 29/04*   (2006.01)
   *G01P 15/14*   (2013.01)
   (Continued)

(52) U.S. Cl.
   CPC .......... *G08B 29/046* (2013.01); *G01P 15/14* (2013.01); *G01S 13/886* (2013.01); *G08B 13/19619* (2013.01); *G08B 13/19632* (2013.01)

(58) Field of Classification Search
   None
   See application file for complete search history.

(56) References Cited

U.S. PATENT DOCUMENTS

| | | | |
|---|---|---|---|
| 3,970,846 A * | 7/1976 | Schofield, Jr. | G01V 8/20 250/221 |
| 5,220,178 A * | 6/1993 | Dreiling | G01N 21/8914 250/559.03 |

(Continued)

FOREIGN PATENT DOCUMENTS

| | | | | |
|---|---|---|---|---|
| CN | 109001695 A | | 12/2018 | |
| DE | 102005053744 B3 * | | 12/2006 | G01G 19/4142 |

(Continued)

OTHER PUBLICATIONS

Italian Search Report and Written Opinion in corresponding Italian Application No. 102019000007059, dated Feb. 3, 2020, 8 pages.

*Primary Examiner* — Fekadeselassie Girma
(74) *Attorney, Agent, or Firm* — MH2 Technology Law Group LLP

(57) ABSTRACT

Disclosed is a method for detecting tampering of a target detection system, comprising a control unit is in signal communication with a set of present tamper detection sensors, which are associated with a detection member. The method includes setting an overall sensor coordination logic for determining a tamper state of the system based on tamper detection data from a predetermined set of sensors, wherein the set of present sensors is a subset. Then, the control unit controls the operating state of each sensor of the set of present sensors and defines a reduced sensor coordination logic, excluding those sensors of the predetermined set that are missing and/or non-working from the overall logic. Thus, the present and working sensors cyclically acquire tamper detection data, and the control unit determines the tamper state of the system by processing the data acquired based on the reduced logic.

17 Claims, 1 Drawing Sheet

(51) Int. Cl.
*G01S 13/88* (2006.01)
*G08B 13/196* (2006.01)

(56) References Cited

U.S. PATENT DOCUMENTS

| | | | | |
|---|---|---|---|---|
| 7,293,238 B1* | 11/2007 | Brook | ............... | G06F 21/552 |
| | | | | 709/224 |
| 7,356,585 B1* | 4/2008 | Brook | ............... | H04L 63/1416 |
| | | | | 709/224 |
| 7,895,649 B1* | 2/2011 | Brook | ............... | H04L 63/1441 |
| | | | | 726/22 |
| 10,062,249 B1* | 8/2018 | Modi | ............... | G08B 13/08 |
| 2003/0098409 A1* | 5/2003 | Bond | ............... | G01N 21/59 |
| | | | | 250/223 R |
| 2009/0271144 A1* | 10/2009 | Reibel | ............... | G08B 13/1472 |
| | | | | 702/154 |
| 2011/0261195 A1* | 10/2011 | Martin | ............... | G08B 29/046 |
| | | | | 348/143 |
| 2016/0182541 A1* | 6/2016 | Lim | ............... | H04L 43/026 |
| | | | | 726/23 |
| 2020/0175782 A1* | 6/2020 | Tokman | ............... | G07C 5/085 |
| 2020/0279446 A1* | 9/2020 | Hage | ............... | E05B 83/10 |

FOREIGN PATENT DOCUMENTS

| | | | | |
|---|---|---|---|---|
| EP | 3460514 A1 | 3/2019 | | |
| FR | 3007840 A1 * | 1/2015 | ............... | B60R 25/04 |
| GB | 2351995 A * | 1/2001 | ............... | E21D 23/12 |
| WO | WO-2017186658 A1 * | 11/2017 | ............... | H04W 4/20 |

* cited by examiner

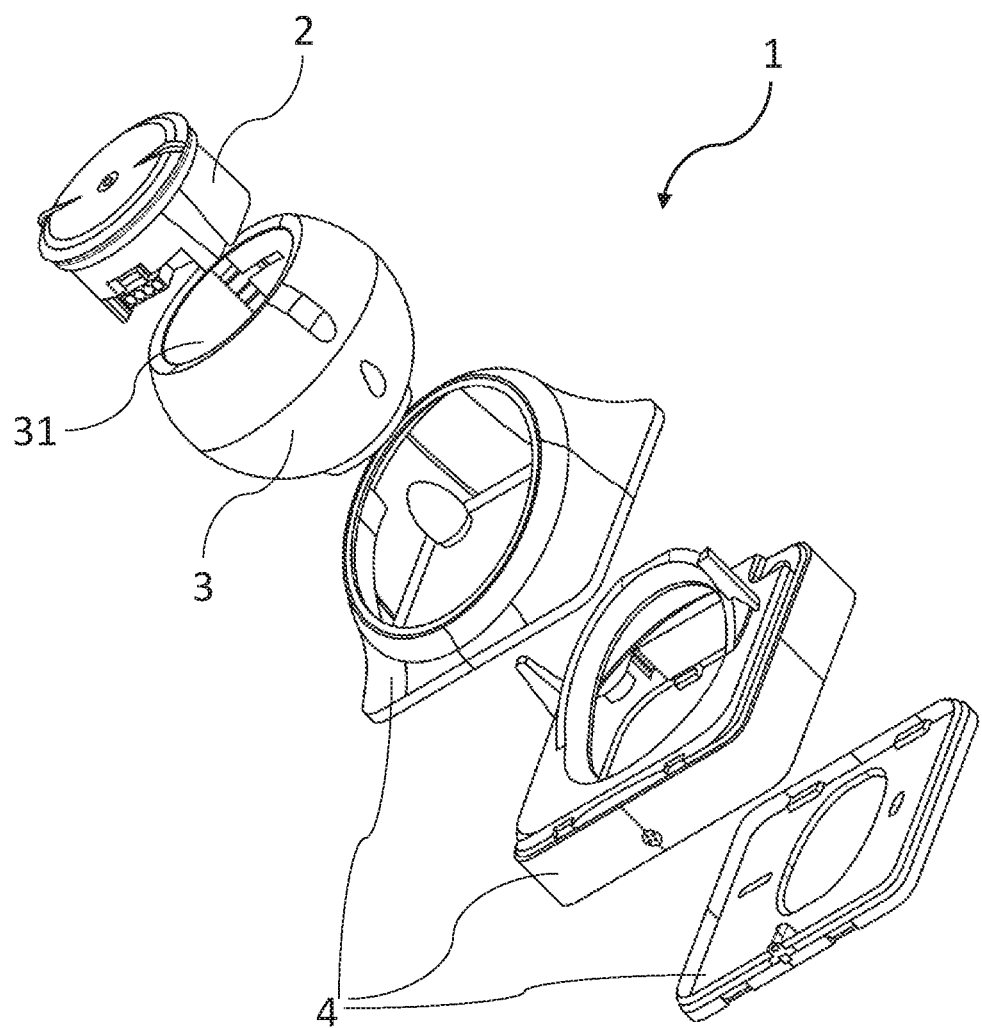

METHODS FOR DETECTING TAMPERING OF TARGET DETECTION SYSTEMS

CROSS-REFERENCE TO RELATED APPLICATION(S)

This application claims priority under 35 U.S.C. § 119 from Italian Patent Application No. 102019000007059, filed on May 21, 2019, in the Italian Patent and Trademark Office ("IPTO"), the entire contents of which are incorporated herein by reference.

TECHNICAL FIELD

The present invention relates to the field of the detection of objects in an environment to be monitored, e.g. using radar technologies. More in detail, the invention relates to a method for detecting tampering of a target detection system, and a target detection system in which such method is implemented.

BACKGROUND ART

Systems for detecting objects in an environment, such as radar systems, can transmit an electromagnetic signal into an environment to be monitored and receive a signal reflected from the objects to identify their position in the environment.

EP 3460514 discloses a detection system 1, which is also shown by reference in FIG. 1 in an exploded view, comprising a support structure 4 adapted to be fixed to a wall. This detection system 1 comprises a spherical body 3 adapted to be locked to the support structure 4 in multiple spatial orientations and a detection member 2 inserted in a seat 31 of the spherical body 3. The detection member 2 comprises a sensitive element configured to sense the movement of a body in an environment. Thus, the spherical body 3 can be rotated and locked in different operating positions with respect to the support structure 4, also according to the orientation of the support wall on which the detection system 1 is applied, thereby ensuring proper detection of a target within the environment to be monitored.

Target detection system similar to the one described above can be used for safety, both in intrusion alarms and for personnel safety in factories in which hazards occur when moving too close to certain machinery having moving parts.

Problem of the Prior Art

Target detection systems are sometimes exposed to tampering attempts, for example when an intruder detaches the device from the support wall or reorients the spherical body to prevent it from detecting him/her. In addition to intentional tampering attempts, similar drawbacks may occur, for example, in case of accidental impacts on the device.

Tampering may lead to improper or failed operation of the detection device. In both cases, the detection system will not be able to properly detect a target within the environment to be monitored. As a result, failure to detect a target in the monitored environment may lead, for example, to a break-in in the monitored environment, possibly resulting in economic losses. Also, if the detection system is used to shut down an industrial machine, failure to detect an operator in the immediate vicinity of the machine may lead to severe injury to the operator.

Therefore, it is particularly important to check and signal any attempt to tamper with the detection system, to avoid the presence of non-working detection systems. In particular, with reference to the detection system of EP 3460514, the term tampering is intended to designate, for example, any intentional or unintentional attempt to detach the support structure 4 from the support wall, to change the orientation of the spherical body 3 or to detach the sensing member 2 from the spherical body 3.

SUMMARY OF THE INVENTION

The present invention has the object to solve the aforementioned prior art problems, and in particular to allow detection of possible attempts to tamper with a target detection system.

These and further objects are achieved by a target detection system and a method for detecting tampering in a similar system, according to any of the appended claims.

According to the present invention, the target detection system comprises a control unit which is configured to process, based on an overall sensor coordination logic, tamper detection data from a predetermined set of sensors.

The control unit is in signal communication with a set of present sensors, which generally represents a subset of the predetermined set of sensors. In other words, while the overall logic requires processing of data from a predetermined set of sensors, the control unit is able to operate even when certain sensors of the predetermined set are absent.

Furthermore, the control unit is configured to control the operating state of each sensor of the set of the present sensors to define, in the predetermined set, a subset of present and working sensors and a subset of missing and/or non-working sensors; According to the present invention, the control unit is also configured to define a reduced sensor coordination logic, excluding the subset of missing and/or non-working sensors from the overall logic.

Advantageously, with the target detection method and system of the present invention tampering attempts may be detected.

Still advantageously, any tampering attempt may be detected, regardless of the number and type of present sensors, within the predetermined set. This will provide a particularly robust tamper detection.

BRIEF DESCRIPTION OF THE DRAWINGS

Further characteristics and advantages of the present invention will result more clearly from the illustrative, non-limiting description of a method for detecting tampering of a target detection system, with reference to the accompanying drawings, in which FIG. 1 is an exploded view of a target detection system.

DETAILED DESCRIPTION

According to the present invention, a target detection system 1 comprises a detection member 2 configured to detect a target in a predetermined detection area. In general, the detection member 2 comprises a sensitive element which is configured to detect the movement of a target within the predetermined area.

In one embodiment, like the system of EP 3460514, the target detection system 1 comprises a support structure 4 that is adapted to be fixed to a wall and a spherical body 3 associated with the support structure 4. The spherical body 3 is rotatably supported by the support structure 4 and adapted to be locked to the support structure 4 in a plurality of spatial orientations. In addition, the spherical body 3 comprises a seat 31. The detection member 2 is inserted into the seat 31 of the spherical body 3 in a direction of insertion. However, target detection systems 1 having a structure other than that described herein or in EP 3460514 may be also provided.

The system further comprises a set of present sensors comprising at least one tamper detection sensor. Each sensor of the set of present sensors is associated with the detection member 2, and is mounted, for instance, to the detection member 2. In addition, the system comprises a control unit in signal communication with the set of present sensors. It should be noted that the control unit may be intended as a single processing device physically distinct from the sensors, or as a set of processing devices that cooperate to perform the functions as described below. Optionally, certain parts of the control unit may be incorporated in the same devices that perform the function of tamper detection sensors.

For proper detection of tampering of the target detection system 1, sensor coordination logics are set and operated with the method for detecting tampering of a target detection system 1 of the present invention.

Such tamper detection method comprises the steps as described below. A skilled person will also determine from the following description which components of the target detection system 1 system are configured to carry out these steps.

The method comprises the step of setting an overall sensor coordination logic. Preferably, such overall coordination logic is set by an external user during installation of the target detection system 1. As more clearly explained hereinafter, this overall coordination logic can be set in different manners according to the environment in which the target detection system 1 is installed and according to the degree of sensitivity required for detecting tampering attempts of the target detection system 1.

Alternatively, the overall coordination logic may be pre-stored in the control unit.

The control unit is configured to process, based on the aforementioned overall logic, tamper detection data from a predetermined set of sensors comprising a plurality of tamper detection sensors. As more clearly explained hereinafter, this overall logic comprises a logical combination of tamper indications for each sensor of the predetermined set.

More in detail, the term tamper detection data is intended to designate a physical quantity measurement signal generated by a sensor and sent to the control unit, whereas the term tamper indication is intended to designate a positive or negative signal, based on whether the corresponding tamper detection data is or not compatible with a tamper condition.

The set of present sensors is a subset of the predetermined set. In other words, the control unit is configured to process tamper detection data from a number of sensors that is greater than or equal to the number of sensors actually present in the target detection system 1. Indeed, the predetermined set may correspond to the set of present sensors or may contain it, further including additional sensors which are not present or at least are not in signal communication with the control unit, and from which no tamper data or tamper indication is received. However, as more clearly explained hereinafter, the control unit is able to check whether the set of present sensors corresponds to the predetermined set or whether it is a subset thereof, i.e. which sensors of the predetermined set are actually present.

This means that the same control unit, which has been set with a specific overall logic, may be adapted to the absence of certain sensors of the predetermined set or to the presence of different possible sets of present sensors, which are subsets of the predetermined set.

Preferably, the predetermined set of tamper detection sensors comprises at least two sensors of different natures. In particular, at least one of the sensors of the predetermined set may be selected from the group consisting of an accelerometer, a magnetometer and a gyroscope. Preferably, at least two different sensors are selected from such group, and more preferably, the predetermined set of tamper detection sensors comprises at least one accelerometer, one magnetometer and one gyroscope.

In the case of an accelerometer, the tamper detection data corresponds to the measurement of a linear acceleration, which may provide information about translational movements of the detection member 2, with or separately from other parts of the structure of the detection system 1, and/or reorientations of the detection member 2 with respect to the direction of the acceleration of gravity. In the case of a magnetometer, the tamper detection data corresponds to the measurement of a magnetic field, which may provide information about the reorientation of the detection member 2 with respect to the earth's magnetic field. Finally, in the case of a gyroscope, the tamper detection data corresponds to a measurement of an angular acceleration, which may provide information about any type of reorientation of the detection member 2.

The method further comprises the step of controlling, by the control unit, the operating state of each sensor of the set of the present sensors to define, in the predetermined set, a subset of present and working sensors and a subset of missing and/or non-working sensors.

In other words, the control unit is configured to distinguish the present sensors, i.e. the sensors installed in the target detection system 1 by being associated with the detection member 2 and in signal communication with the control unit, from the missing sensors, i.e. those that are not installed in the target detection system 1 but are present in the predetermined set related to the overall coordination logic. Yet in other words, the control unit is configured to check whether the set of present sensors corresponds to the predetermined set of sensors. In addition, the control unit is configured to distinguish present and working sensors, i.e. sensors from which a reliable tamper detection data is received, from present and non-working sensors, i.e. sensors from which no tamper detection data or tamper detection data considered unreliable is received. The reliability of tamper detection data can be determined, as is known to the skilled person, according to the nature of the sensor and the malfunctions typically associated with the sensor.

Therefore, the set of present and working sensors is a subset of the set of present sensors present, and vice versa the set of missing and/or non-working sensors comprises the missing sensors and the present, non-working sensors. On the other hand, the predetermined set is given by the union of the subset of present and working sensors and the subset of missing and/or non-working sensors.

In the event that each sensor in the set of present sensors is properly working, the set of present and working sensors corresponds to the set of present sensors. On the other hand, if each sensor in the set of present sensors is properly working and the set of present sensors corresponds to the predetermined set, the set of missing and/or non-working sensors corresponds to the empty set, i.e. contains a number of sensors equal to zero.

Then, the method comprises defining, by the control unit, a reduced sensor coordination logic, excluding the subset of missing and/or non-working sensors from the overall logic.

In other words, the control unit is configured to simplify the overall logic by adapting it to the set of present and working sensors.

If the set of present and working sensors corresponds to the predetermined set, then the reduced logic corresponds, at least temporarily, to the overall logic. In any case, a function for reducing the overall logic may be generally identified, which is associated with the control unit, e.g. by being stored therein, and will be promptly actuated in case of failure of any of the present sensors.

In the preferred embodiment, the method further comprises a step of acquiring and storing an idle state of each sensor of the set of present sensors. Preferably, the idle state of each sensor of the set of present sensors is stored in a non-volatile memory. When the target detection system 1 is switched off, the idle states of each sensor remain stored in the non-volatile memory. As more clearly explained hereinafter, when the target detection system 1 is switched off, the idle state of each sensor may be retrieved by accessing the non-volatile memory.

The idle state of each sensor comprises the tamper detection data of the sensor in the absence of tamper event. In other words, the idle state of each sensor comprises the tamper detection data of the sensor when no disturbance is applied to the sensor. In yet other words, the idle state of each sensor comprises tamper detection data of the sensor acquired during installation of the target detection system 1. For example, the idle state for an accelerometer may be represented by the acceleration of gravity, the idle state for a magnetometer may comprise the earth's magnetic field, and the idle state for a gyroscope may be given by zero angular acceleration.

In addition, the method includes defining a specific tamper threshold for each sensor of the set of present sensors. As more clearly explained hereinafter, this sensor-specific tamper threshold is used to define the tamper indication of each sensor.

After the step of acquiring and storing an idle state of each sensor of the set of present sensors and the step of defining a specific tamper threshold for each sensor of the set of present sensors, the method comprises the step of acquiring, by each sensor of the subset of present and working sensors, a tamper detection data. Then, such tamper detection data is sent from each sensor to the control unit.

It should be noted that each tamper detection data, each idle state of the sensors and each tamper threshold may generally correspond to absolute values, and/or vector values, and/or angular values of their respective physical quantities.

The method further comprises determining a tamper state of the target detection system 1 by processing, by the control unit, the detection data acquired by the subset of present and working sensors based on the reduced logic. Then, this tamper state of the target detection system 1 may be sent to an external device, for example to generate a tamper alarm signal, allowing actions to be taken to restore the proper operation of the target detection system 1.

As more clearly explained hereinafter, the tamper state of the target detection system 1 may correspond to an occurred tamper event or an absence of tamper event. Likewise, the tamper indications for each sensor may also correspond to an occurred tamper event or an absence of tamper event. Nevertheless, the tamper indications for each sensor and the tamper state of the system that has been determined do not necessarily match, as explained below.

In particular, the step of determining the tamper state of the system comprises determining a tamper indication for each sensor of the set of present and working sensors based on its respective tamper detection data, and the logic combination of tamper indications for each sensor of the set of present and working sensors based on the reduced logic. The logic combination may provide, for example, a combination of the tamper indications using the logic operators "AND" and/or "OR".

Preferably, the tamper indication for each sensor of the set of present and working sensors corresponds to an occurred tamper event when the tamper detection data of the sensor differs from the corresponding idle state by a value that is at least equal to the specific tamper threshold for such sensor.

In other words, if the tamper detection data of a sensor matches the corresponding idle state or differs therefrom by a value that is less than the specific tamper threshold for such sensor, the tamper indication for such sensor will correspond to an absence of tamper event.

Also preferably, the tamper indication for each sensor of the set of present and working sensors corresponds to an occurred tamper event when the detection data of such sensor differs from the corresponding idle state by a value that is at least equal to the specific tamper threshold for such sensor for at least a predetermined time interval. In other words, if the detection data of a sensor differs from the corresponding idle state by a value that is equal to or higher than the specific tamper threshold for such sensor for a time that is less than the predetermined time interval, the tamper indication for such sensor will corresponds to an absence of tamper event. Therefore, in order to obtain a positive tamper indication, it is not sufficient that the corresponding tamper detection data deviates from the idle state, even to a considerable extent, for a very short time.

It should be noted that both the specific tamper threshold for each sensor and the predetermined time interval may be defined according to the sensitivity required for detecting tampering attempts of the target detection system 1. Appropriate setting of tamper threshold values or predetermined time intervals will prevent any inadvertent movements from being considered as tampering attempts and, at the same time, will enable recognition of actual tampering attempts. In fact, it is highly likely that an inadvertent movement will allow a sensor to acquire tamper detection data similar to the corresponding idle state of the sensor or to acquire detection data that differs from the idle state by at least the corresponding threshold value but for a short time interval. On the other hand, it is highly likely that a tampering attempt will lead a sensor to acquire detection data that considerably differs from the corresponding idle state and for a long time interval.

In one embodiment, a first lower threshold value corresponding to a first longer predetermined time interval and a second higher threshold value corresponding to a second shorter predetermined time interval may be provided for at least one sensor. Therefore, tampering attempts may be detected if they imply weak and long or short and strong deviations from the idle state.

If the target detection system 1 is switched off and on again, the method comprises the further step of retrieving the idle state of each sensor of the set of present sensors from the non-volatile memory.

In the next cycles, in order to determine the tamper indication for each sensor of the set of present and working sensors, the method comprises the step of comparing the tamper detection data acquired by each sensor of the set of present and working sensors with the corresponding retrieved idle state. As previously mentioned, the difference between the idle state of a sensor and the corresponding acquired tamper detection data enables to define whether the tamper indication for the sensor corresponds or not to an occurred tamper event.

As mentioned hereinbefore, the overall logic comprises a logic combination of tamper indications for each sensor of the predetermined set and the control unit is configured to define the subset of the present and working sensors and to define a reduced logic excluding the subset of missing and/or non-working sensors from the overall logic. Accordingly, the reduced logic comprises a logic combination of tamper indications for each sensor of the set of present and working sensors. For this reason, the following considerations concerning the overall logic will also apply to the reduced logic, when limited to the present and working sensors.

According to a first embodiment, the overall coordination logic provides a tamper state of the system that corresponds to an occurred tamper event if at least one tamper indication for the set of present and working sensors corresponds to an occurred tamper event. If no other conditions occur, the overall coordination logic provides a tamper state of the system that corresponds to an absence of tamper event when no tamper indication for the sensors of the set of present and working sensors corresponds to an occurred tamper event.

According to a second embodiment, which may be provided instead of and/or in combination with the previous embodiment, the overall coordination logic provides a tamper state of the system that only corresponds to an occurred tamper event if at least two of the tamper indications for the set of present and working sensors correspond to an occurred tamper event. If no other conditions occur, the overall coordination logic provides a tamper state of the system that corresponds to an absence of tamper event if only one tamper indication of the tamper indications for the sensors of the set of present and working sensors corresponds to an occurred tamper event.

Preferably, processing of tamper detection data based on said overall logic comprises calculating an aggregate tamper detection data according to the detection data of each sensor of the predetermined set of sensors and determining an aggregate tamper indication based on the aggregate tamper detection data. As mentioned hereinbefore, the control unit is configured to define the subset of the present and working sensors and to define a reduced logic excluding the subset of missing and/or non-working sensors from the overall logic. Accordingly, processing of tamper detection data based on said reduced logic may comprise calculating reduced aggregate tamper detection data according to the detection data of each sensor of the set of present and working sensors and determining a reduced aggregate tamper indication based on the reduced aggregate tamper detection data, if the set of present and working sensors comprises at least two sensors.

For this reason, the following description concerning the aggregate tamper detection data will also apply to the reduced aggregate tamper detection data.

In one embodiment, the method may include the step of calibrating the sensors of the set of present sensors. This calibration comprises the step of acquiring tamper detection data for each sensor of the set of present sensors, and a subsequent step of associating each tamper detection data acquired with a direction of the environment in which the target detection system 1 is installed. This association may be carried out, for example, in the idle state of each sensor.

It shall be noted that the method of the invention may lead to satisfactory results even without calibration. This is because, irrespective of the relation between the idle states of the sensors and the spatial installation directions of the detection member 2, various types of movement of the detection member 2 cause variations in the detection data from the idle states that may be recognized as tampering. However, calibration allows a geometric meaning to be associated with the tamper detection data acquired by each sensor of the set of present sensors, thereby affording recognition of different types of tampering, such as reorientation of the spherical body 3 or detachment of the support structure 4 from the wall.

The calibration of the sensors may be particularly useful prior to the optional step of calculating aggregate tamper detection data. This is because an aggregate tamper detection data so obtained will correspond to the absolute pointing direction of the set of present sensors, and/or the detection member 2. If the set of present sensors comprises an accelerometer, a magnetometer and a gyroscope, calculating the absolute pointing direction may correspond to calculating, in degrees, the angle with respect to the magnetic north pole (azimuth angle), the angle with respect to the acceleration of gravity (elevation angle) and the angle of rotation (or roll) of the detection member 2 of the target sensing system 1. If the set of present sensors comprises only one or two sensors of the group consisting of an accelerometer, a magnetometer and a gyroscope, calculating the absolute pointing direction may correspond to calculating one angle only or two angles of the group consisting of an azimuth angle, a rotation angle and an elevation angle of the detection member 2.

Preferably, after the step of acquiring tamper detection data for each sensor of the set of present sensors, the calibration may comprise a step of temporal filtering of the acquired tamper detection data. This temporal filtering can eliminate the noise in the acquired tamper detection data, thus facilitating the subsequent step of aggregation of the acquired tamper detection data.

The step of determining an aggregate tamper indication based on the aggregate tamper detection data comprises the sub-step of acquiring and storing an aggregate idle state and defining an aggregate tamper threshold. The aggregate idle state comprises the aggregate tamper detection data when no disturbance is applied to the set of present sensors. In other words, the aggregate idle state comprises aggregate tamper detection data acquired during installation of the target detection system 1.

Preferably, the aggregate tamper indication corresponds to an occurred tamper event when the aggregate tamper detection data differs from the aggregate idle state by a value at least equal to the aggregate tamper threshold.

Still preferably, the aggregate tamper indication corresponds to an occurred tamper event when the aggregate tamper detection data differs from the aggregate idle state by a value at least equal to the aggregate tamper threshold for a predetermined time interval.

The above considerations about the specific tamper threshold for each sensor of the set of present and working sensors also apply to the aggregate tamper threshold.

For example, the aggregate idle state is stored in the non-volatile memory. Thus, the aggregate idle state may be retrieved even when the detection system 1 is switched off. Then, the aggregate tamper indication is obtained by comparing the aggregate tamper detection data with the retrieved aggregate idle state and the aggregate tamper threshold.

In a third embodiment, the overall logic is based on the aggregate tamper indication, without considering the tamper detection indications of the individual sensors. Therefore, the tamper state of the system corresponds to an occurred tamper event only if the aggregate tamper indication corresponds to an occurred tamper event.

In any case, in the preferred embodiments, the overall logic comprises a logic combination of the tamper indications for each sensor of the predetermined set and the aggregate tamper indication. In other words, the overall logic provides a tamper state of the system based on the tamper indication of each sensor and based on the aggregate tamper indication. Likewise, considering the relationship between the overall logic and the reduced logic, the following considerations concerning the overall logic and the aggregate tamper indication shall also apply to the reduced logic and the reduced aggregate tamper indication, when limited to present and working sensors.

According to a fourth embodiment of the method, which may be provided in combination with the first or second embodiment, the overall coordination logic provides a tamper state of the system that only corresponds to an occurred system tamper event if at least one of the tamper indications for the sensors of the set of present and working sensors corresponds to an occurred tamper event and, at the same time, if also the aggregate tamper indication corresponds to an occurred tamper event. If no other conditions occur, the overall coordination logic provides a tamper state of the system that corresponds to an absence of tamper event at least when no tamper indication for the sensors of the set of present and working sensors corresponds to an occurred tamper event and/or when the aggregate tamper indication does not corresponds to an occurred tamper event.

According to a fifth embodiment of the method, which is provided instead of the previous embodiments, the overall coordination logic provides a tamper state of the system that corresponds to an occurred system tamper event if at least one, and in particular even just any one, of the aggregate tamper indication and the tamper indications for the sensors of the set of present and working sensors corresponds to an occurred tamper event. If no other conditions occur, the overall coordination logic provides a tamper state of the system that corresponds to an absence of tamper event if no tamper indication for the sensors of the set of present and working sensors corresponds to an occurred tamper event and if, at the same time, the aggregate tamper indication does not correspond to an occurred tamper event.

Preferably, the method includes the additional step of detecting a target by the target detection system 1, and the location of the detected target. The method also comprises the step of producing, by the control unit, an intruder detection indication. This intruder detection indication corresponds to an occurred tamper event if the detected target is located in a predetermined intruder detection area. Conversely, such intruder detection indication corresponds to an absence of tamper event if the detected target is located outside the predetermined intruder detection area or if no target is detected.

The intruder detection area is preferably a region of the field of view of the detection member 2, namely a region extending from the detection member 2 to a predetermined maximum distance, for example less than or equal to 1 m. This predetermined intruder detection area may be set during installation of the target detection system 1. Alternatively, this predetermined intruder detection area be pre-stored in the control unit.

The intruder detection area may thus represent an area in which someone who tampers with the system 1 is to be detected. Therefore, tamper detections by the sensors may be ignored if no intruder is detected proximate to the detection member 2.

More in detail, in a sixth embodiment, i.e. if the control unit generates an intruder detection indication, the overall logic comprises a logic combination of the intruder detection indication with the tamper indications for each sensor of the predetermined set, and/or with the aggregate tamper indication. This sixth embodiment may be combined with any of the previous five embodiments.

Preferably, the overall coordination logic provides a system tamper indication that corresponds to an occurred system tamper event only if at least the intruder detection indication corresponds to an occurred tamper event. Conversely, said overall coordination logic provides a system tamper indication that corresponds to an absence of system tamper event if the intruder detection indication does not correspond to an absence of tamper event.

Nevertheless, the intruder detection indication and the tamper state of the system that has been determined do not necessarily match. Thus, depending on how, according to the overall logic, the control unit combines the tamper indications for each sensor of the predetermined set, the aggregate tamper indication and the intruder detection indication to obtain the tamper state of the system, the intruder detection indication may correspond to an occurred tamper event, while the tamper state of the system corresponds to an absence of tamper event. This is the case, for example, of a person that moves toward the system without tampering it, with the sensors providing negative tamper indications.

In a further embodiment, the overall coordination logic provides a tamper state of the system that only corresponds to an occurred system tamper event if all the tamper indications for the sensors of the set of present and working sensors, and optionally the aggregate tamper indication and optionally the intruder detection indication, correspond to an occurred tamper event.

It will be understood that the particular selected logic greatly affects the sensitivity of the system leading either to risks caused by excessive sensitivity, whereby positive system tamper states are determined even when the system has not been tampered with, or risks caused by poor sensitivity, whereby the system cannot detect certain types of tamper.

Therefore, it is advantageous to set the overall logic in different manners, according to the environment in which the system is installed. For example, in an industrial environment with machines having magnetic or otherwise ferrous components, there is a risk that the magnetometer will cause a large number of false alarms, whereby no tamper determination will be preferably made on the system even when only the magnetometer indicates possible tampering. In other words, the indication from the magnetometer may be combined with the indications of other sensors according to a "AND" logic.

Likewise, an accelerometer may be too sensitive in an environment with strong vibrations.

On the other hand, there is a risk that the intruder detection indication will be poorly sensitive, i.e. easily circumvented, if the detection member 2 can be reached by an intruder located behind the system, i.e. outside its field of view. This may occur, for example, if the system is mounted on a pole, while the intruder detection indication being more reliable if the system is mounted to a wall.

Preferably, the target detection system 1 further comprises a plurality of micro-switches associated with the target detection member 2. These micro-switches can identify possible tampering attempts aimed at detaching the detection member 2 from the spherical body 3. In fact, if the micro-switches detect that the detection member 2 has been detached, the method comprises the additional step of sending a detachment indication to the control unit by the micro-switches. In this case, the control unit provides a tamper state of the system that corresponds to an occurred tamper event when the control unit receives a detachment indication and/or based on the processing performed according to the overall logic, as mentioned hereinbefore. Alternatively, the detachment indication may be introduced into the overall logic, whereby the control unit provides a tamper state that corresponds to an occurred tamper event only based on the processing performed according to the overall logic.

The invention claimed is:

1. A method for detecting tampering of a target detection system, the target detection system comprising a detection member configured to detect a target in a predetermined detection area and a control unit in signal communication with a set of present sensors comprising at least one sensor, wherein each of the sensors of the set of present sensors is a tamper detection sensor connected to the detection member, the method comprising:
defining a predetermined set of sensors, comprising a plurality of tamper detection sensors, wherein the set of present sensors is a subset of the predetermined set of sensors, wherein the predetermined set of sensors comprises at least two sensors that are different from each other and are different from the detection member, and wherein each of the tamper detection sensors is configured to acquire tamper detection data about a tampering state of the detection member;
setting up an overall sensor coordination logic, wherein the control unit is configured to process, based on the overall sensor coordination logic, the tamper detection data from the predetermined set of sensors;
controlling, by the control unit, an operating state of each of the sensors of the set of present sensors to define, in the predetermined set of sensors, a subset of present and working sensors and a subset of missing and/or non-working sensors;
defining, by the control unit, a reduced sensor coordination logic, excluding the subset of missing and/or non-working sensors from the overall sensor coordination logic;
acquiring the tamper detection data from each of the sensors of the subset of present and working sensors; and
determining a tamper state of the target detection system by processing, by the control unit, the tamper detection data acquired by the subset of present and working sensors based on the reduced sensor coordination logic.

2. The method of claim 1, wherein the predetermined set of sensors comprises at least two different sensors selected from a group consisting of an accelerometer, a magnetometer, and a gyroscope.

3. The method of claim 1, wherein the overall sensor coordination logic comprises a logical combination of tamper indications for each of the sensors of the predetermined set of sensors, and
wherein determining the tamper state of the target detection system comprises determining a tamper indication for each of the sensors of the subset of present and working sensors based on its respective tamper detection data, and the logical combination of the tamper indications for each of the sensors of the subset of present and working sensors based on the reduced sensor coordination logic.

4. The method of claim 3, further comprising, prior to acquiring the tamper detection data:
acquiring and storing an idle state of each of the sensors of the set of present sensors, the idle state of each of the sensors comprising the tamper detection data of the respective sensor in an absence of a tamper event; and
defining a specific tamper threshold for each of the sensors of the set of present sensors;
wherein the tamper indication for each of the sensors of the subset of present and working sensors corresponds to an occurred tamper event when the tamper detection data of the respective sensor differs from a corresponding idle state by a value that is at least equal to the specific tamper threshold for the respective sensor.

5. The method of claim 4, wherein the tamper indication for each of the sensors of the subset of present and working sensors corresponds to an occurred sensor tamper event when the tamper detection data of the respective sensor differs from the corresponding idle state by a value that is at least equal to the specific tamper threshold for the respective sensor for at least a predetermined time interval.

6. The method of claim 3, wherein processing of the tamper detection data based on the overall sensor coordination logic comprises calculating an aggregate tamper detection data according to the tamper detection data of each of the sensors of the predetermined set of sensors and determining an aggregate tamper indication based on the aggregate tamper detection data, and
wherein the overall sensor coordination logic comprises a logical combination of the tamper indications for each of the sensors of the predetermined set of sensors and the aggregate tamper indication.

7. The method of claim 6, wherein the overall sensor coordination logic provides a tamper state of the target detection system that only corresponds to an occurred system tamper event if the aggregate tamper indication corresponds to an occurred tamper event and, at the same time, also at least one of the tamper indications for the sensors of the subset of present and working sensors corresponds to an occurred tamper event.

8. The method of claim 3, wherein the overall sensor coordination logic provides a tamper state of the target detection system that only corresponds to an occurred tamper event if at least two of the tamper indications for the subset of present and working sensors correspond to an occurred tamper event.

9. The method of claim 6, wherein the overall sensor coordination logic provides a tamper state of the target detection system that corresponds to an occurred system tamper event if at least one of the aggregate tamper indication and the tamper indications for the sensors of the subset of present and working sensors corresponds to an occurred tamper event.

10. The method of claim 6, further comprising:
detecting a target by the target detection system, and determining a location of the detected target; and
generating, by the control unit, an intruder detection indication, the intruder detection indication only corresponding to an occurred tamper event if the detected target is located in a predetermined intruder detection area;
wherein the overall sensor coordination logic comprises a logical combination of the tamper indications for each of the sensors of the predetermined set of sensors, the intruder detection indication, and optionally the aggregate tamper indication, and
wherein the overall sensor coordination logic provides a system tamper indication that only corresponds to an occurred system tamper event if at least the intruder detection indication corresponds to an occurred tamper event.

11. A target detection system, comprising:
a detection member configured to detect a target in a predetermined detection area;
a set of present sensors comprising at least one sensor, wherein each of the sensors of the set of present sensors is a tamper detection sensor connected to the detection member;
a control unit in signal communication with the set of present sensors;
wherein the control unit is configured to:
process, based on an overall sensor coordination logic, tamper detection data from a predetermined set of sensors comprising a plurality of tamper detection sensors, wherein the set of present sensors is a subset of the predetermined set of sensors, wherein the predetermined set of sensors comprises at least two sensors that are different from each other and are different from the detection member, and wherein each of the tamper detection sensors is configured to acquire the tamper detection data about a tampering state of the detection member;
controlling an control an operating state of each of the sensors of the set of present sensors to define, in the predetermined set of sensors, a subset of present and working sensors and a subset of missing and/or non-working sensors;
define a reduced sensor coordination logic, excluding the subset of missing and/or non-working sensors from the overall sensor coordination logic; and
determine a tamper state of the target detection system by processing the tamper detection data acquired by each of the sensors of the subset of present and working sensors based on the reduced sensor coordination logic.

12. The method of claim 1, wherein the detection member is a radar detection member.

13. The method of claim 1, wherein at least two sensors of the predetermined set of sensors are non-radar sensors.

14. The method of claim 1, wherein the detection member is a radar detection member, and
wherein at least two sensors of the predetermined set of sensors are non-radar sensors.

15. The target detection system of claim 11, wherein the detection member is a radar detection member.

16. The target detection system of claim 11, wherein at least two sensors of the predetermined set of sensors are non-radar sensors.

17. The target detection system of claim 11, wherein the detection member is a radar detection member, and
wherein at least two sensors of the predetermined set of sensors are non-radar sensors.

* * * * *